United States Patent
Mair et al.

(10) Patent No.: US 9,822,908 B2
(45) Date of Patent: Nov. 21, 2017

(54) HYDROFORM TUBE AND METHOD OF FORMING

(71) Applicant: Ford Global Technologies, LLC, Dearborn, MI (US)

(72) Inventors: Scott Mair, Woodhaven, MI (US); Steven William Gallagher, Bloomfield Hills, MI (US); Joshua Jacob Clement, Dearborn, MI (US); Vladimir Vladimirovich Bogachuk, West Bloomfield, MI (US); Jon A. Wilcox, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 214 days.

(21) Appl. No.: 14/964,878

(22) Filed: Dec. 10, 2015

(65) Prior Publication Data
US 2017/0167638 A1    Jun. 15, 2017

(51) Int. Cl.
*F16L 9/00* (2006.01)
*F16L 9/02* (2006.01)
*B21D 26/033* (2011.01)

(52) U.S. Cl.
CPC .............. *F16L 9/02* (2013.01); *B21D 26/033* (2013.01); *F16L 9/006* (2013.01)

(58) Field of Classification Search
CPC .................................................. B21D 26/033
USPC ..... 138/177, 178, DIG. 11; 29/421.1; 72/58, 72/61, 370.22, 370.23
See application file for complete search history.

(56) References Cited

U.S. PATENT DOCUMENTS

| | | | | |
|---|---|---|---|---|
| 5,070,717 A | * | 12/1991 | Boyd ..................... | B21D 19/00 29/421.1 |
| 5,339,667 A | * | 8/1994 | Shah ..................... | B21D 26/033 29/421.1 |
| 5,735,156 A | * | 4/1998 | Yoshitomi .............. | B21D 15/00 29/421.1 |
| 5,813,266 A | * | 9/1998 | Ash ....................... | B21D 22/025 29/421.1 |
| 5,974,846 A | * | 11/1999 | Ash ....................... | B21D 22/025 72/55 |
| 6,739,166 B1 | * | 5/2004 | Shah ..................... | B21D 19/00 29/421.1 |
| 7,051,768 B2 | * | 5/2006 | Takahashi ............. | B21D 26/033 138/114 |
| 7,343,574 B2 | | 3/2008 | Sawai | |
| 7,587,303 B2 | | 9/2009 | De Hillerin et al. | |

(Continued)

FOREIGN PATENT DOCUMENTS

WO    WO 2010066711    6/2010

*Primary Examiner* — Patrick F Brinson
(74) *Attorney, Agent, or Firm* — Jason C. Rogers; Bejin Bieneman PLC

(57) ABSTRACT

A hydroform tube includes a first end and a second end. The hydroform tube includes a plurality of sides including a first side and a second side, and a fillet extending from the first side to the second side. The first side, the second side, and the fillet extend from the first end to the second end. The plurality of sides form different shapes at two cross-sections between the first end and the second end. The tube has substantially the same perimeter P at all cross-sections from the first end to the second end. The fillet has a radius R. The radius R is defined by a same formula at all cross-sections from the first end to the second end.

13 Claims, 5 Drawing Sheets

(56) References Cited

U.S. PATENT DOCUMENTS

| | | | |
|---|---|---|---|
| 8,171,769 B2* | 5/2012 | Barthelemy | B21D 15/03 72/370.22 |
| 8,191,583 B2* | 6/2012 | Mizumura | B21D 26/033 138/177 |
| 8,381,560 B2* | 2/2013 | Mizumura | B21D 26/033 72/58 |
| 8,826,712 B1* | 9/2014 | Luckey, Jr. | B21D 26/033 29/421.1 |
| 8,978,432 B2* | 3/2015 | Christianson | B21D 26/033 29/421.1 |
| 9,545,657 B2* | 1/2017 | Ilinich | B21D 26/041 |
| 2004/0167752 A1 | 8/2004 | Sawai | |
| 2015/0029181 A1 | 1/2015 | Lerey | |

* cited by examiner

HYDROFORM TUBE AND METHOD OF FORMING

BACKGROUND

Tube hydroforming is a process of creating parts having a tubular shape but with potentially unusual geometries. First, a die with the appropriate form encloses a tube while sealing rods cover each end of the tube. Next, pressurized water is injected through one of the sealing rods; the water pressure stretches the tube to conform to the shape of the die.

One pitfall of tube hydroforming is that variations in the cross-sectional perimeters of a finished part can cause thinning or even splitting, rendering the part useless. More specifically, if a section of a part has a wider perimeter, then the tube must stretch farther during pressurization to conform to the die. If it stretches too thin, the part weakens and possibly breaks.

Preventing these problems currently requires ad hoc checking and rechecking of the three-dimensional model during the design phase. Accordingly, an opportunity exists for a tube design that overcomes these deficiencies.

DETAILED DESCRIPTION

Figure 1:
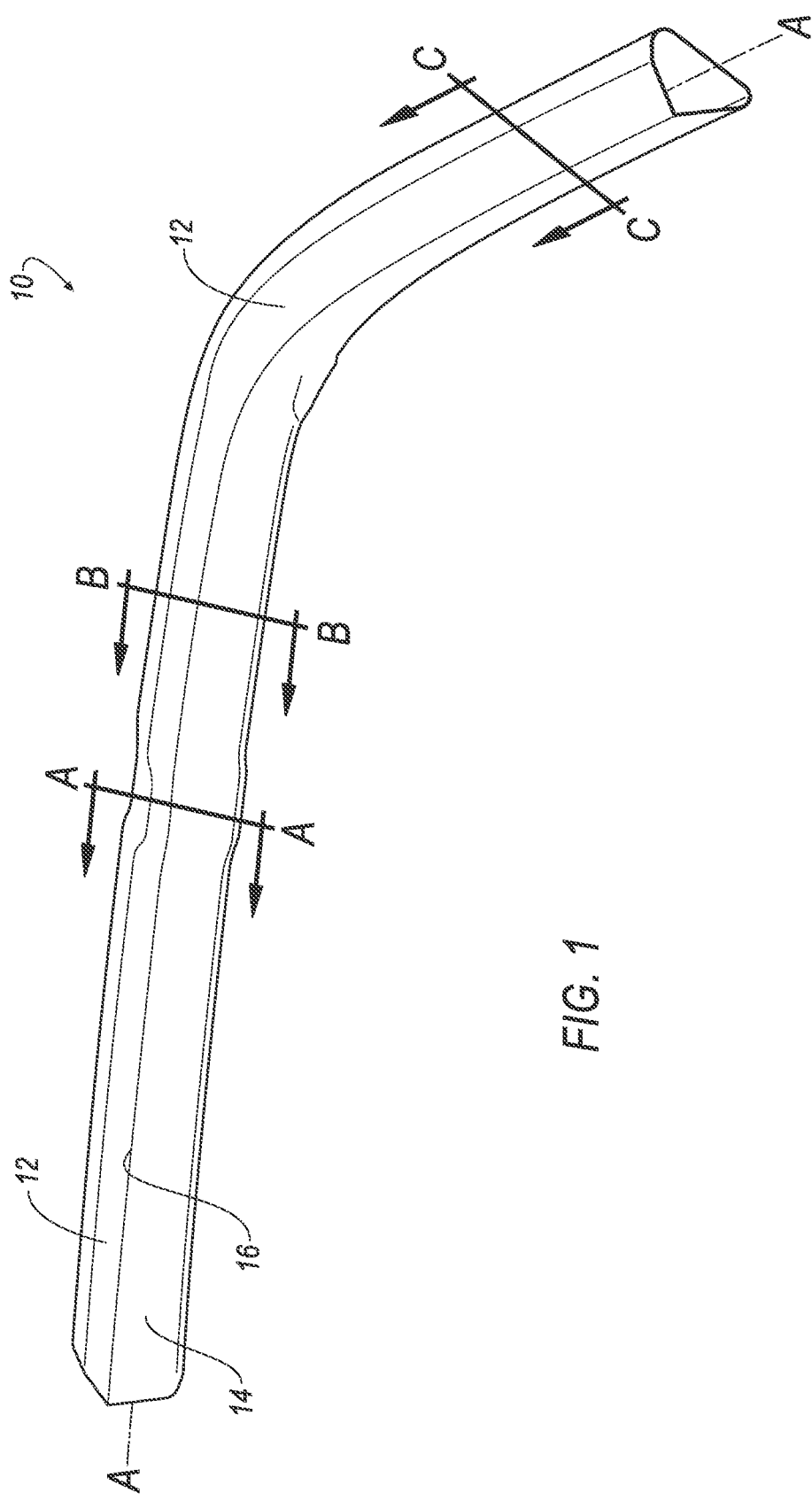
FIG. 1 is a perspective view of a model for a hydroform tube.

With reference to the Figures, wherein like numerals indicate like parts throughout the several views, a hydroform tube 30 includes a first end 32 and a second end 34. The hydroform tube 30 includes a plurality of sides 48 including a first side 36 and a second side 38, and a fillet 40 extending from the first side 36 to the second side 38. The first side 36, the second side 38, and the fillet 40 extend from the first end 32 to the second end 34. The plurality of sides 48 have different shapes at two cross-sections between the first end 32 and the second end 34. The tube 30 has substantially the same perimeter P at all cross-sections from the first end 32 to the second end 34. The fillet 40 has a radius R. The radius R is defined by a same formula at all cross-sections from the first end 32 to the second end 34.

A method of forming the hydroform tube 30 includes defining the plurality of sides 50 of the hydroform tube 10 including the first side 12 and the second side 14. The first and second sides 12 and 14 extend along respective axes A1 and A2 that intersect at a corner 16. The method includes forming the fillet 26 to the corner 16 at the two cross-sections so that a perimeter P of the two cross-sections is substantially the same. The method also includes forming a radius R of the fillet 26 based on the same formula at both cross-sections.

Producing the hydroform tube 30 according to the method creates benefits for both the design stage and the finished hydroform tube 30 produced from the method. At the design stage, the method saves time because the method replaces ad hoc checking, tweaking, and rechecking of the design to ensure a similar perimeter at all relevant cross-sections of the tube. As for the hydroform tube 30, by ensuring a constant perimeter along the length of the hydroform tube 30, the method reduces the likelihood that the hydroform tube 30 will thin or split during fabrication.

A model 10 of the hydroform tube 30 in a three-dimensional design program is shown generally in a perspective view in FIG. 1. The three-dimensional design program may be a computer programs that create and or stores the model 10. Examples of the three-dimensional design program includes CATIA, ProE, etc.

The model 10 has a plurality of sides 50 including a first side 52 and a second side 54 extending along respective axes A1 and A2 that intersect at a corner 56. The axes A1 and A2 may intersect at any suitable angle at the corner 16. Cross-sections of the model 10 may be perpendicular to a longitudinal axis A of the model 10. For example, in FIG. 1, the cross-sections A-A, B-B, and C-C are perpendicular to the longitudinal axis A of the model 10.

The plurality of sides 50 of the model 10 form different shapes at the cross-sections. Various design considerations may result in the different cross-sectional shapes. For example, the model 10 may have a curvature, i.e., the longitudinal axis A may curve; a change in cross-section may support a connection with another component; or the different shapes may give desired values for strength, rigidity, etc.

Figure 2:
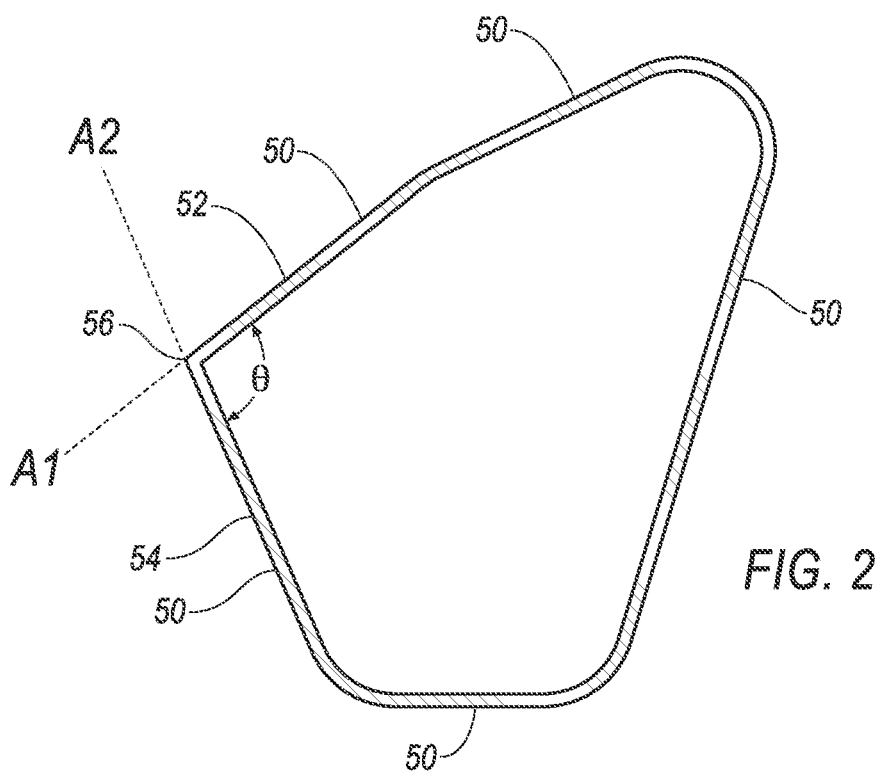
FIG. 2 is a cross-sectional view of the model.

FIG. 2 shows a cross-sectional view of cross-section B-B. As set forth above, cross-section B-B includes sides 52 and 54 and corner 56. The corner 16 defines an angle θ. As set forth above, θ may have any suitable value and may vary along the longitudinal axis A.

Figure 3:
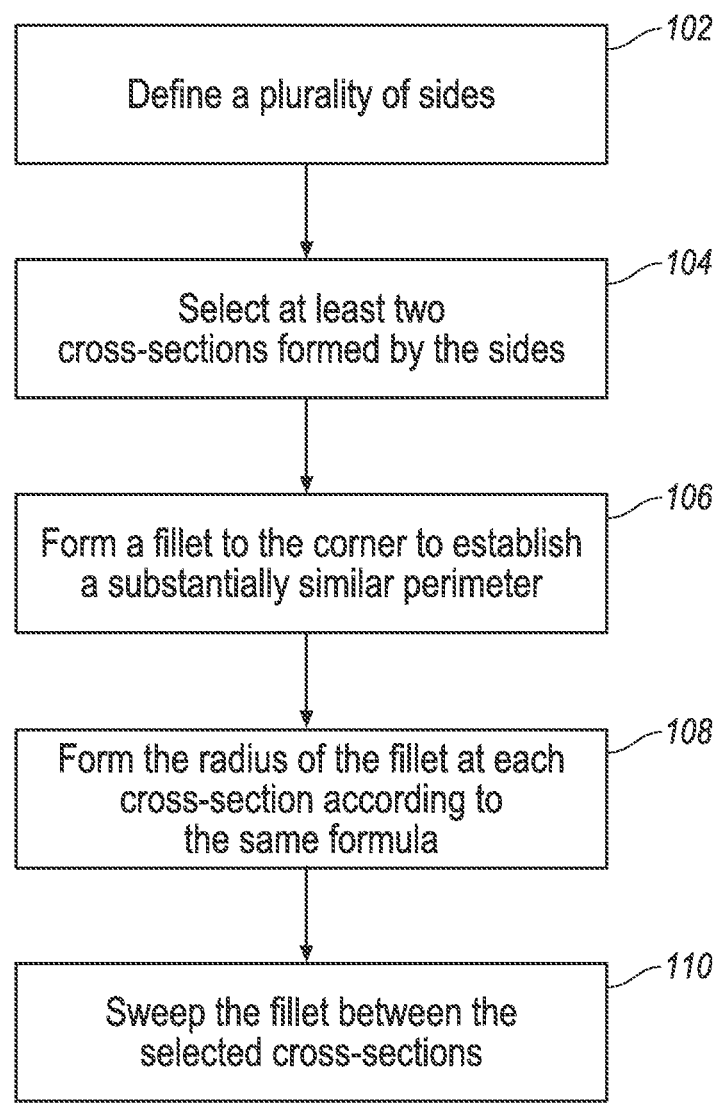
FIG. 3 is a diagram of an exemplary process for designing the hydroform tube.

FIG. 3 generally diagrams one embodiment of the method operating the model 10. The method includes defining the plurality of sides 50 of the model 10, as shown in block 102. The method also includes selecting at least two cross-sections spaced along the longitudinal axis A, as shown in block 104. Specifically, the method may include selecting any suitable number of the cross-sections along the longitudinal axis A.

With reference to block 106, the method also includes forming a fillet 26 on the corner 16 at the cross-sections selected in block 104 such that a perimeter P of the cross-sections is substantially the same, e.g., similar enough to render the risk of splitting negligible. For example, a change in perimeter of up to 0.5% along 70 mm along the longitudinal axis A may render the risk of splitting negligible.

With reference to block 108 in FIG. 3, the method includes forming the radius R of the fillet 26 according to a same formula at all cross-sections selected in block 104. Specifically, the method includes measuring quantities that the formula can use as inputs. For example, the method may include measuring the angle θ of the corner 16 between the first side 12 and the second side 14 for the two or plurality of cross-sections. Alternatively, or in addition, the method may include measuring an initial perimeter IP of the model 10. The initial perimeter IP is the perimeter of the cross-section before the fillet 26 is applied at the corner 16, i.e., the perimeter of the cross-section including the corner 56. The formula can then take as inputs the perimeter P (i.e., the desired perimeter at the cross-section), the initial perimeter IP, and the angle θ (where θ is measured in radians). Specifically, the formula may be:

$$R = \frac{IP - P}{\frac{2}{\tan\left(\frac{\theta}{2}\right)} - (\pi - \theta)}$$

With reference to FIG. 110 in FIG. 3, the method includes sweeping the fillet 26 between two cross-sections so that the radius R is defined by the same formula continuously between the cross-sections i.e., at each possible cross-section that could be defined between the two cross-sections, the radius R is defined according to the formula for that possible cross-section. The sweep may be automatically applied by the three-dimensional modeling program. For example, the three-dimensional modeling program may include functions to perform the sweeping. In CATIA, for example, the command "adaptive sweep" can create a continuously varying surface according to a user-defined formula.

Figure 4:
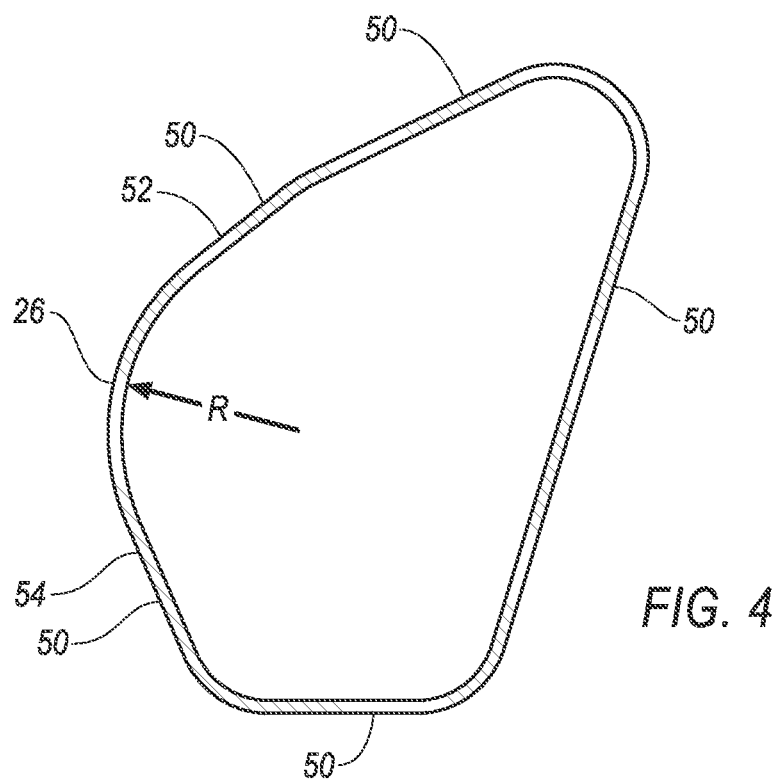
FIG. 4 is a cross-sectional view of the model after applying the exemplary process.

FIG. 4 shows the cross-section B-B of the model 10 modified as a result of the method is shown in FIG. 3. The fillet 26 of radius R has replaced corner 16 and has shortened the first side 12 and the second side 14.

Figure 5:
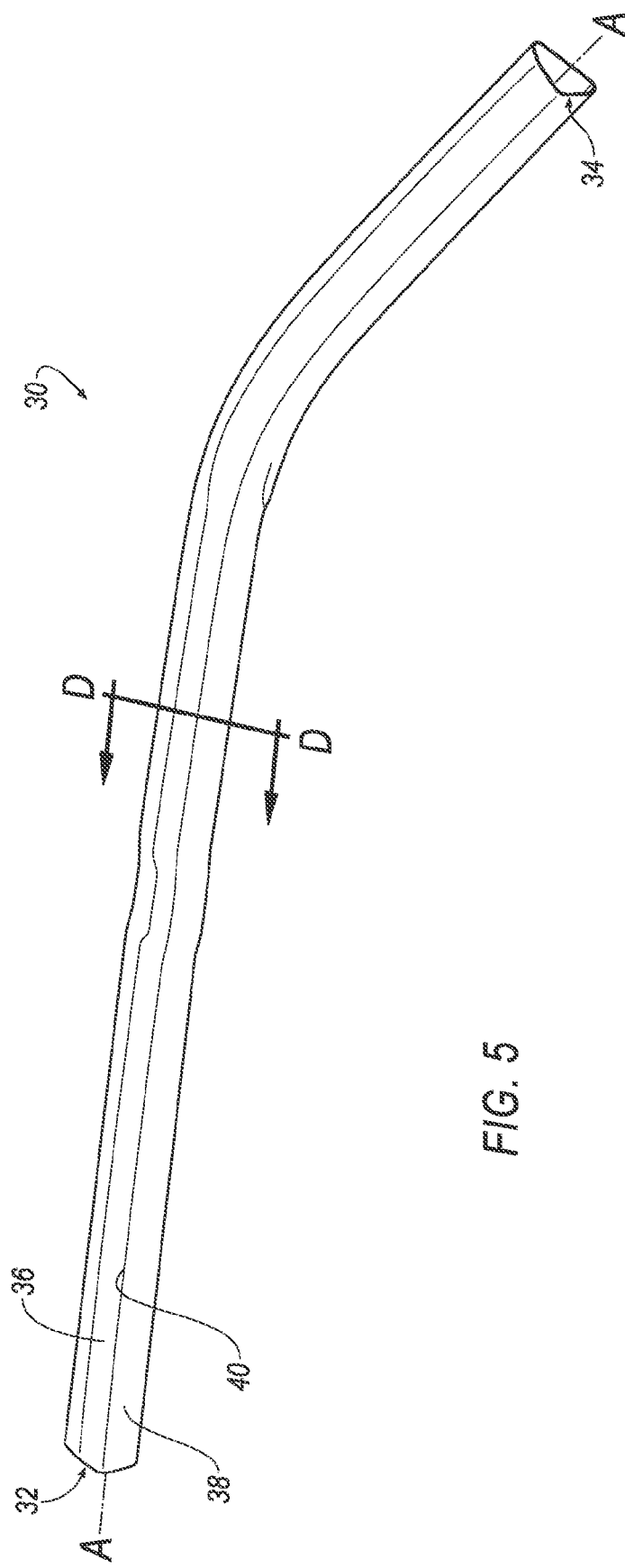
FIG. 5 is a perspective view of the hydroform tube.

A die may be formed based on the model 10 to manufacture hydroform tubes 30 with reduced risk of splitting. The hydroform tube 30 formed from the method shown in FIG. 3 is shown in FIG. 5. The hydroform tube 30 may be, for example, formed of a ductile metal such as aluminum or steel.

With reference to FIG. 5, as set forth above, the hydroform tube 30 includes the first end 32, the second end 34, and the plurality of sides 48 including a first side 36 and a second side 38. The first side 36 and the second side 38 extend from the first end 32 to the second end 34; in other words, the first side 36 and the second side 38 run the length of the tube 30 from the first end 32 to the second end 34. The remainder of the plurality of sides may or may not run the length of the tube 30 from the first end 32 to the second end 34.

The fillet 40 extends from the first side 36 to the second side 38. The fillet 40 may extend from the first end 32 to the second end 34, running the length of the tube 30. The fillet has a radius R, which can have a different value at different cross-sections, as described above with respect to the model 10. The first side 36, the second side 38, and the fillet 40 of the hydroform tube 30 correspond to the first side 12, second side 14, and fillet 26, respectively, of the model 10. As set forth above, the plurality of sides 48 form cross-sections definable at any point between the first end 32 to the second end 34 and oriented perpendicular to the longitudinal axis A of the tube 30. An illustrative cross-section D-D is marked in FIG. 5.

All cross-sections of the hydroform tube 30 between the first end 32 and the second end 34 have substantially the same perimeter P. In other words, as set forth above, the perimeter P is similar enough to render the risk of splitting negligible. Typically, a change in perimeter of up to 0.5% along 70 mm along the longitudinal axis A is safe.

Even though the perimeter remains substantially the same at all cross-sections from the first end 32 to the second end 34, the hydroform tube 30 has cross-sections of different shapes. Various design considerations may explain the different cross-sectional shapes. For example, the hydroform tube may have a curvature; a change in cross-section may support a connection with another component; or the different shapes may give desired values for strength, rigidity, etc.

Figure 6:
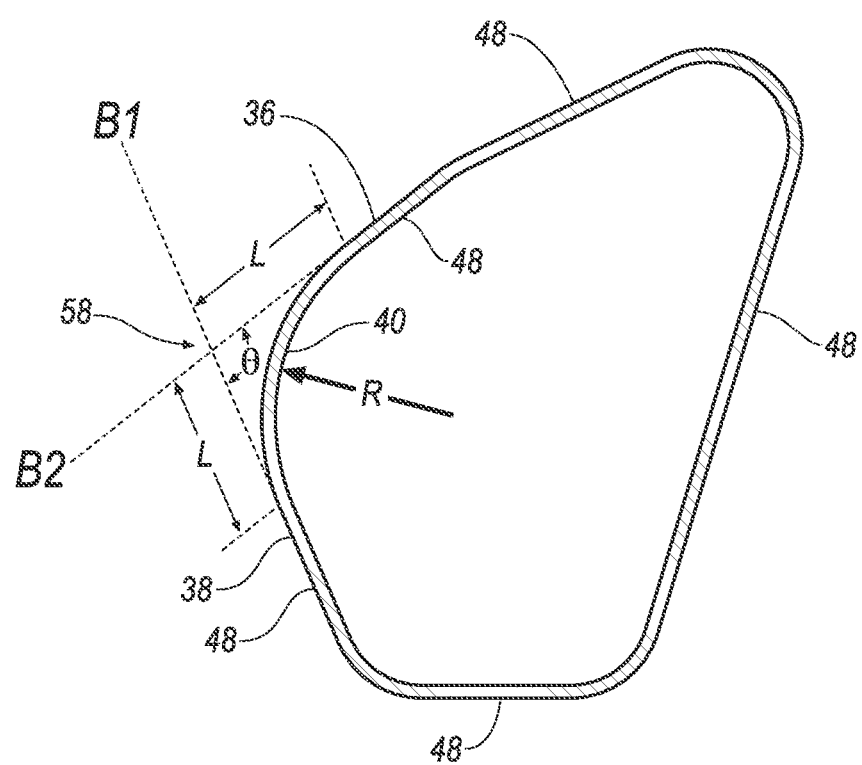
FIG. 6 is a cross-sectional view of the hydroform tube.

FIG. 6 shows a cross-sectional view of cross-section D-D. Cross-section D-D includes sides 36 and 38 and fillet 40. The fillet 40 has a radius R, as described above in relation to the model 10. The first side 36 extends along a first axis B1; likewise, the second side 38 extends along a second axis B2.

The first and second axes B1 and B2 intersect at an angle $\theta$ at a constructive corner 58 which may be a different value at each cross-section. The angle $\theta$ may be of any suitable value between zero and $\pi$ radians (between zero and 180 degrees).

Each cross-section has a constructive perimeter CP, which depends on the geometry of each cross-section. The fillet 40 has an arc length. The first and second axes B1 and B2 extend lengths L from the first side 36 and the second side 38, respectively, to their intersection. The constructive perimeter CP, then, equals the perimeter P minus the arc length of the fillet 40 plus the lengths L of the first and second axes B1 and B2; in other words, the constructive perimeter CP is the perimeter of the cross-section when substituting the constructive corner 58 for the fillet 40. Because the fillet 40 and the corner vary between the first end 32 to the second end 34, the constructive perimeter CP also varies between the first end 32 and the second end 34.

The radius R of the fillet 40 is defined by the same formula at all cross-sections between the first end 32 to the second end 34. In other words, the radius R may vary continuously along the tube 30. Specifically, at each possible cross-section that could be defined between the two ends 32 and 34, the radius R is defined according to the same formula for that possible cross-section. The formula can then take as inputs the angle $\theta$ or the constructive perimeter CP, and the angle $\theta$, each of which may differ at different cross-sections. As set forth above, the formula (assuming $\theta$ is measured in radians) is as follows:

$$R = \frac{\frac{CP-P}{2}}{\tan\left(\frac{\theta}{2}\right)} - (\pi - \theta)$$

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A hydroform tube comprising:
   a first end and a second end;
   a plurality of sides including a first side and a second side;
   a fillet extending from the first side to the second side and having radius R;
   the first side, the second side, and the fillet extending from the first end to the second end;
   the plurality of sides having different shapes at two cross-sections between the first end and the second end; and
   the tube having substantially the same perimeter P at all cross-sections from the first end to the second end;
   wherein the radius R is defined by a same formula at all cross-sections from the first end to the second end.

2. A hydroform tube according to claim 1, wherein the first side extends along a first axis at the fillet, the second side extends along a second axis at the fillet, wherein the first and second axes intersect at an angle $\theta$ at each cross-section, and wherein the formula takes as an input at least the angle $\theta$ at each cross-section.

3. A hydroform tube according to claim 1, wherein the fillet has an arc length at each cross-section;

the first side extends along a first axis at the fillet;
the second side extends along a second axis at the fillet intersecting the first axis at a corner;
the first and second axes extend lengths from the first side and from the second side, respectively, to the corner;
each cross-section has a constructive perimeter CP equaling the perimeter P minus the arc length plus the lengths; and
the formula takes as an input at least the constructive perimeter CP at each cross-section.

4. A hydroform tube according to claim 3, wherein
the first and second axes define an angle θ at each cross-section, and the formula takes as inputs the perimeter P, the constructive perimeter CP, and the angle θ at each cross-section.

5. A hydroform tube according to claim 4, wherein
the angle θ is measured in radians, and
the formula is this equation:

$$R = \frac{\frac{CP-P}{2}}{\tan\left(\frac{\theta}{2}\right)} - (\pi - \theta).$$

6. A hydroform tube according to claim 1, wherein the tube is made of a ductile metal.

7. A method comprising:
defining a plurality of sides of a hydroform tube including a first side and a second side, the first and second sides extending along respective axes that intersect at a corner, the plurality of sides forming different shapes at two cross-sections spaced apart from each other;
forming a fillet to the corner at the two cross-sections so that a perimeter P of the two cross-sections is substantially the same; and
forming a radius R of the fillet based on a same formula at both cross-sections.

8. A method according to claim 7, further comprising measuring an angle θ of the corner between the first side and the second side for the two cross-sections, wherein the formula takes as an input at least the angle θ.

9. A method according to claim 7, further comprising measuring an initial perimeter IP for the two cross-sections before applying the fillet to the corner, wherein the formula takes as an input at least the initial perimeter IP.

10. A method according to claim 9, further comprising measuring an angle θ of the corner between the first side and the second side for the two cross-sections, wherein the formula takes as inputs the perimeter P, the initial perimeter IP, and the angle θ.

11. A method according to claim 10, wherein:
the angle θ is measured in radians, and
the formula is this equation:

$$R = \frac{\frac{IP-P}{2}}{\tan\left(\frac{\theta}{2}\right)} - (\pi - \theta).$$

12. A method according to claim 11, further comprising sweeping the fillet between the two cross-sections, wherein the radius R is defined by the formula continuously along the corner from one of the cross-sections to the other of the cross-sections.

13. A method according to claim 7, further comprising:
defining a plurality of cross-sections in addition to the two cross-sections and spaced apart along the model; and
applying the fillet based on the formula at all of the plurality of cross-sections.

* * * * *